No. 772,482. PATENTED OCT. 18, 1904.
T. THOMSON.
APPARATUS FOR TRANSFERRING BOATS FROM ONE BODY OF WATER TO ANOTHER.
APPLICATION FILED JULY 25, 1904.
NO MODEL. 4 SHEETS—SHEET 1.
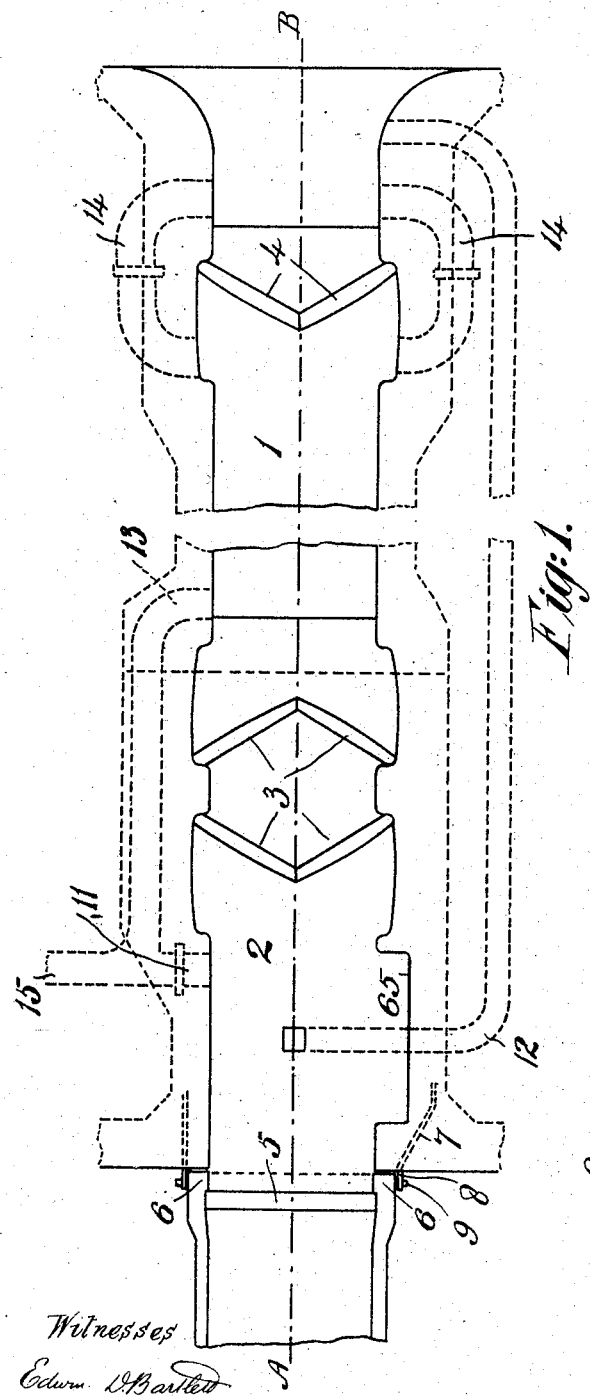
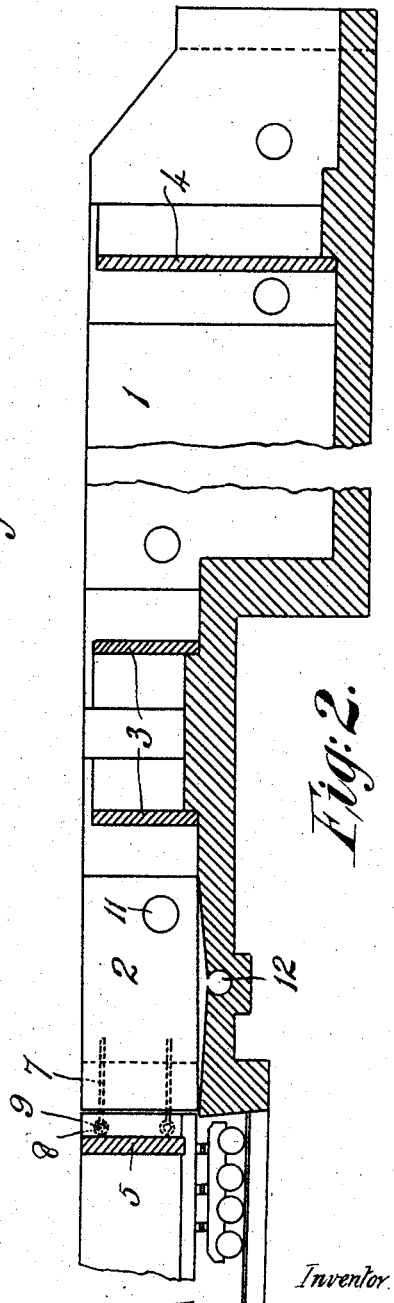
Witnesses
Edwin D. Bartlett
E. A. Gullier
Inventor
Thomas Thomson
per Hubert Sefton Jones
Attorney No. 772,482. PATENTED OCT. 18, 1904.
T. THOMSON.
APPARATUS FOR TRANSFERRING BOATS FROM ONE BODY OF WATER TO ANOTHER.
APPLICATION FILED JULY 25, 1904.
NO MODEL. 4 SHEETS—SHEET 2.
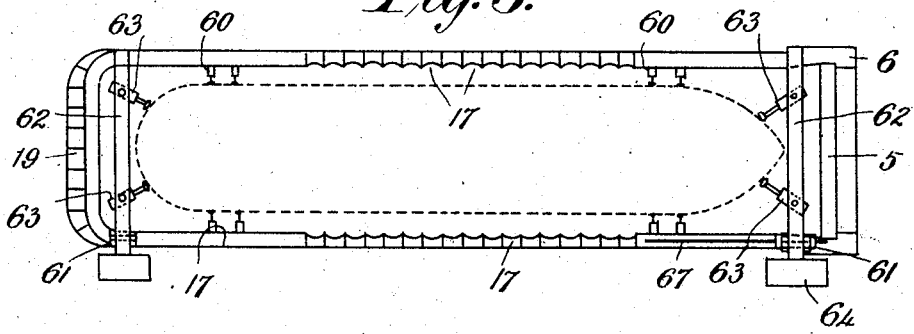
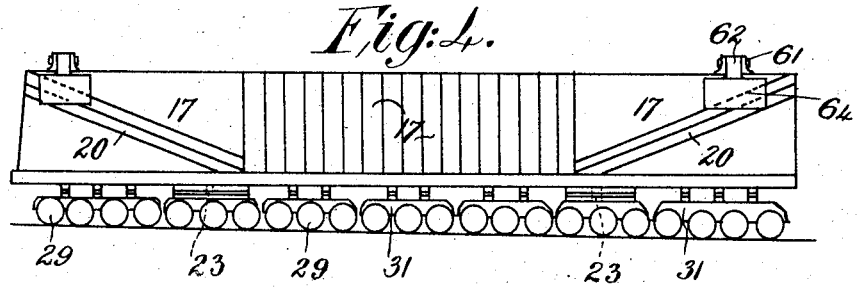
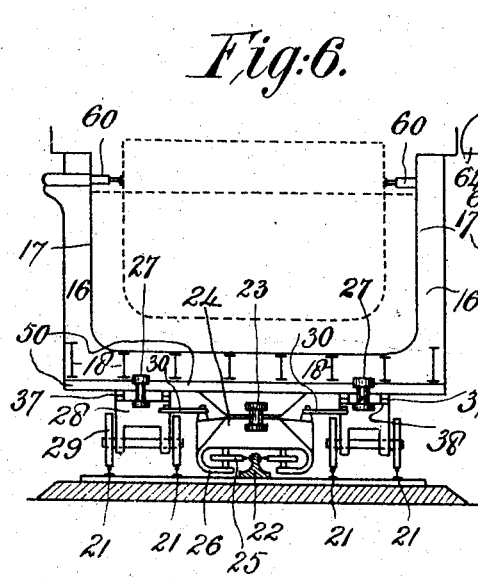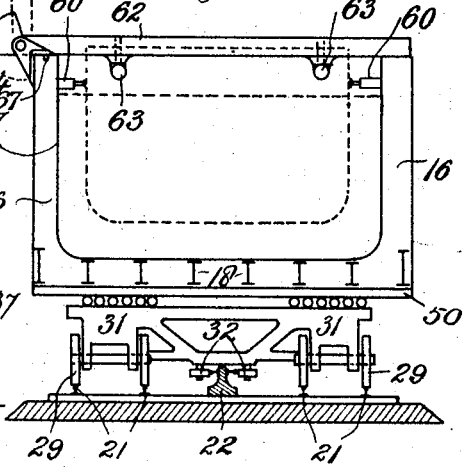
Witnesses
Inventor
Thomas Thomson
per Herbert Sefton Jones
Attorney

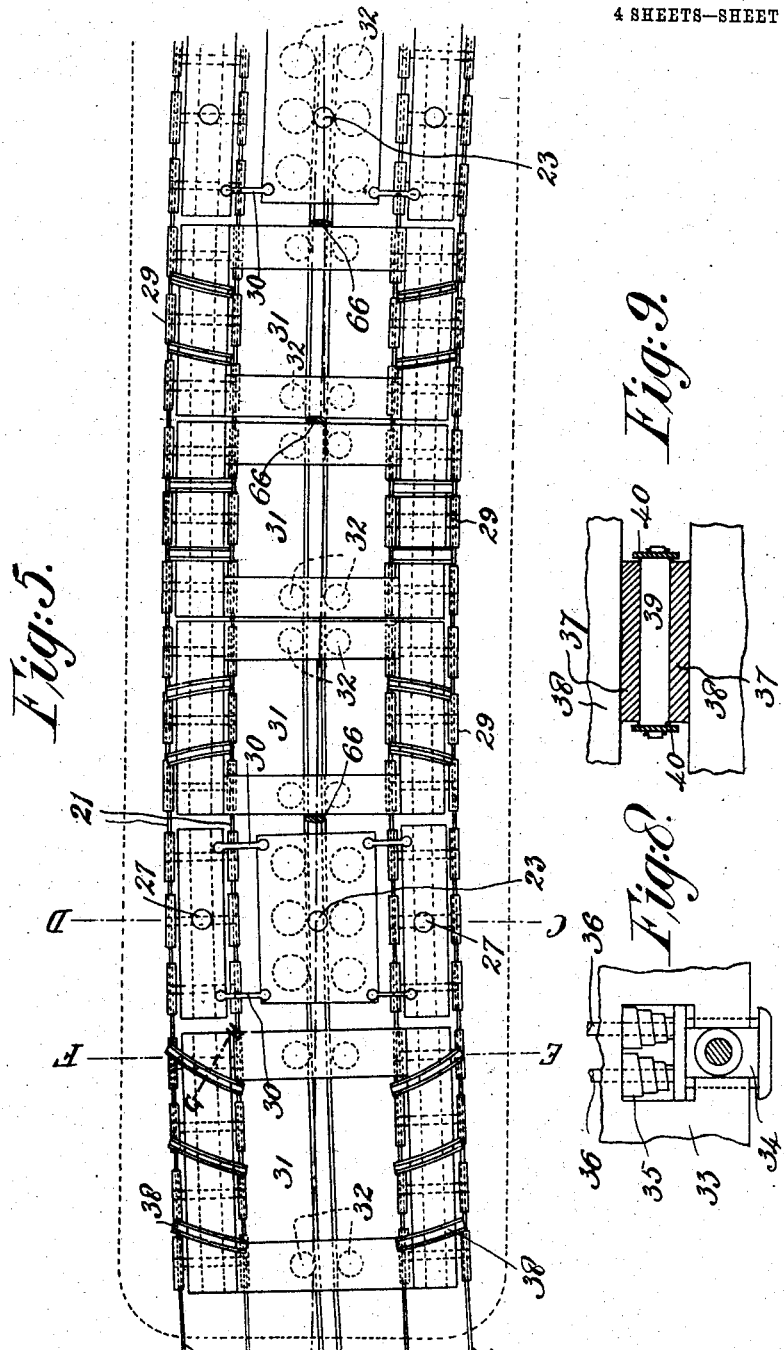

No. 772,482. PATENTED OCT. 18, 1904.
T. THOMSON.
APPARATUS FOR TRANSFERRING BOATS FROM ONE BODY OF WATER TO ANOTHER.
APPLICATION FILED JULY 25, 1904.
NO MODEL. 4 SHEETS—SHEET 4.
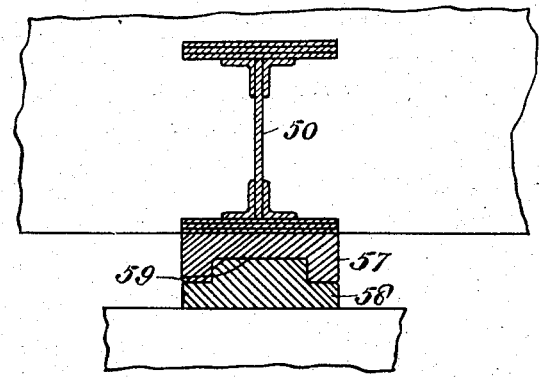
Fig:10.
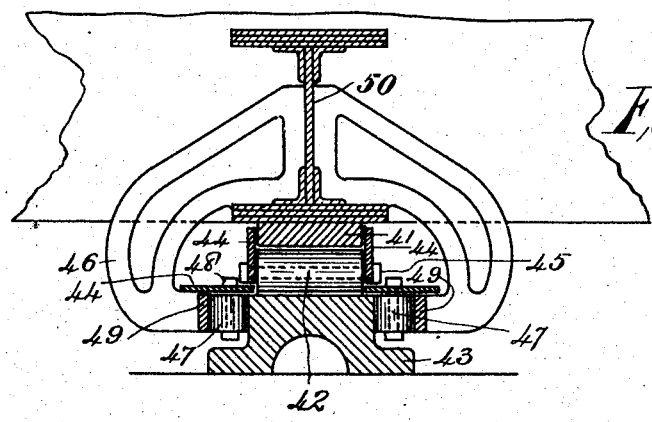
Fig:11.
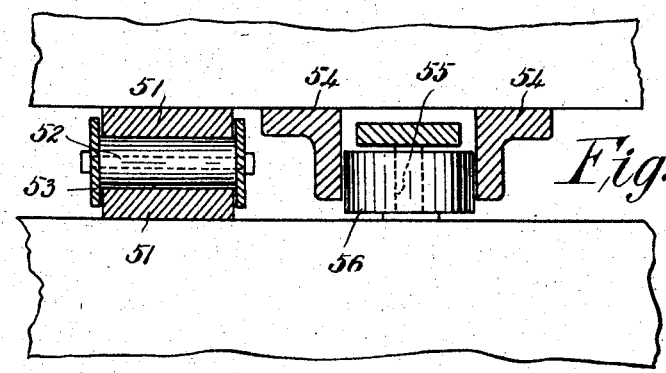
Fig:12.

No. 772,482. Patented October 18, 1904.

UNITED STATES PATENT OFFICE.

THOMAS THOMSON, OF SEAHAM HARBOR, ENGLAND.

APPARATUS FOR TRANSFERRING BOATS FROM ONE BODY OF WATER TO ANOTHER.

SPECIFICATION forming part of Letters Patent No. 772,482, dated October 18, 1904.

Application filed July 25, 1904. Serial No. 218,011. (No model.)

*To all whom it may concern:*

Be it known that I, THOMAS THOMSON, engineer, a subject of the King of Great Britain, residing at The Bungalow, Seaham Harbor, in the county of Durham, England, have invented a new and useful Improved Apparatus for Transferring Boats from One Piece of Water to Another, of which the following is a specification.

This invention relates to apparatus for transferring boats in canals or rivers—for example, from water at one level to water at another level—or from any piece of water to any other piece of water, and it embodies the use of a traveling tank wherein the boat may be carried over a rail-track for a practically unlimited distance.

The invention will be described with reference to the accompanying drawings, in which like parts are indicated throughout by the same reference-numerals.

Figure 1 is a partial plan view, and Fig. 2 a section on the line A B of Fig. 1, showing one construction of lock whereby the boat is isolated from the one stretch of water and is introduced into the traveling tank. Fig. 3 is a plan view, and Fig. 4 an elevation, of the traveling tank. Fig. 5 is an enlarged plan view of the wheel-frames and guides therefor, the body of the tank being indicated in outline by dotted lines. Fig. 6 is a sectional view of the tank, taken on the line C D of Fig. 5. Fig. 7 is a sectional view taken on the line E F of Fig. 5. Fig. 8 is a detail of one of the wheel-bearings. Fig. 9 is a section through one of the guides—for instance, on the line G H of Fig. 5. Figs. 10, 11, and 12 are similar sectional views of modified constructions of the guides shown in Fig. 9.

The chamber or lock for admitting a boat to the traveling tank may have any suitable construction. Figs. 1 and 2 illustrate one construction. The lock has two chambers 1 and 2, separated by two pairs of lock-gates 3 or by any equivalent known device, while the outer lock 1 is cut off from the canal or the like by a pair of gates 4 or any known equivalent for such gates. The tank hereinafter described for carrying the boat is provided at its end with caisson 5 or any known equivalent device adapted to close the end of said tank, the said caisson being arranged to rest against shoulders 6 on the tank. For holding the tank against the end of lock 2 any suitable device may be provided. In the example shown rods 7, embedded in the dock-walls, are provided with loops 8 at their ends, through which pins 9 are passed into the wall of the tank for holding same firmly in position. Any known means is provided for filling and emptying the locks. In the example shown a device is illustrated in dotted lines, wherein 11 is a filling-pipe and 12 represents emptying-pipes for the lock 2, while 13 is a filling-pipe and 14 represents emptying-pipes for the lock 1. Pipes 11 and 13 communicate by the connection 15 with a source of water at higher level, and pipes 12 and 14 discharge beyond the lock 1 into the canal.

The tank itself is formed of U-shaped frames 16, appearing in the sectional views Figs. 6 and 7, said frames being lined with plating 17. The frames 16 are supported by longitudinal girders 18 and transverse girders 50. The frames at the two ends of the tank are made as rigid as possible in any manner or by any arrangement of girders well known to engineers, and diagonal ties 20 are provided for strengthening the said ends. In the middle part of the tank, however, the frames are connected by flexible plating in the manner illustrated in Fig. 3, in which it will be seen that the plates 17 are buckled or arched. The object of this is to allow the tank to bend or arch itself longitudinally in passing over the rail-track without fear of breakage at or near the center.

The forward end of the tank is closed in the example shown by the plating 19, while the rear end has the caisson 5 therein already referred to.

The tank is supported by wheels running on a rail-track. In the example shown the rail-track has four longitudinal rails 21 and a central rail 22, standing higher than the rails 21 and adapted to guide the tank and wheel-frames transversely, as described below. On the tank are arranged two substantial pivots 23, Figs. 5 and 6, both in the central line of the tank and at about one-fourth the length of the tank from its ends. These pivots perform the whole work of guiding the tank on the rail-track. Upon the said pivots work two frames 24, each carrying a plurality of pairs of wheels 25, mounted in a horizontal plane in brackets 26. Said wheels 25 bear against the top of the guide-rail 22, as seen in Fig. 6. On each side of the pivots 23 are arranged other pivots 27, carrying wheel-frames 28, the wheels 29 of which run upon the rails 21. The frames 28 are connected to the frame 24 by links 30 in such a way that the said frames 28 always move parallel to the frame 24. On all other parts of the tank the wheel-frames are not connected directly to the tank-body, but are arranged to slide under the same and to be guided longitudinally by the central rail 22. These disconnected wheel-frames are indicated in the drawings by the reference-numeral 31, and each of said frames has wheels 29, running on the bearing-rails 21, and also at or near each end a pair of guiding-rollers 32, working against the heads of guiding-rail 22.

All the bearing-wheels 29 are flangeless, but are of sufficient breadth to bear properly upon the rails 21 within the limits of the movement of their frames on curves, &c. All the bearing-wheels are mounted in suitable spring axle-boxes. In Fig. 8 one suitable construction is shown by way of example, the bush 34 being in this case arranged to slide in the box 33, while it is normally pressed downward by strong springs 35 and is guided by rods 36, passing through said springs. No novelty of course is claimed for this arrangement; but it is intended to serve merely as an example of a suitable construction.

Suitable bearing-surfaces 38 are provided between the wheel-frames and the under part of the tank. At or near the center, where the lateral movement is slight, plain bearing-surfaces may be used, such as are shown at 37, for the frames 28, linked to the pivoted guiding-frames 24 and also shown in greater detail in Fig. 10. Where the movement is greater, however, and in some cases in all positions, roller-bearings are provided, and these may be constructed in any of the ways illustrated in Figs. 9 to 12. The bearing-surfaces 38, over which the rollers work, are struck to such a radius that when the guiding-wheels 32 cause the wheel-frame to move to one side in passing around a curve in the track the frame is turned so that the bearing-wheels assume positions in planes tangential to the curve in the track. Said bearing-surfaces may consist of arc-shaped bars 38, attached to the under side of the tank and the tops of the wheel-frames in any suitable way. The rollers are tapered, as is shown in the simplest construction in Fig. 9, the tapering being such that the frames will turn truly under the arc-shaped bearing-surfaces. In Fig. 9, 39 is a tapered roller, guided at its ends by plates 40, passed over the pins at the ends of said roller.

Fig. 11 shows a device wherein rollers are provided for taking the weight of the tank and also for guiding the frames horizontally. In this case 41 is the guiding-bar, of suitable curvature, attached beneath the transverse girder 50 of the tank. 42 is the bearing-roller, and 43 the bearing-bar, mounted upon the wheel-frame. The roller 42, or rather a succession of such rollers, such as is shown as seen from the end in Fig. 7, is guided by means of side plates 44, projecting above the sides of the bar 41, and between which plates extend the pins 45, on which the rollers 42 are mounted. From the front and back of the transverse beam 50 are hung brackets 46, carrying flat surfaces or rails 49, between which and the sides of the guide-bar 43 rollers 47, supported on vertical spindles 48 from the plates 44, are adapted to work. It will be seen that the rollers 47 will always guide the wheel-frame in its movements under the tank-body, insuring that the guide-bar 43 on said frame shall remain vertically below the guide-bar 41 on the tank.

Fig. 12 shows a modified arrangement of the guiding-rollers. In this case bearing-surfaces 51 are arranged on the tank and wheel-frame, respectively, between which work rollers 52, held in side plates 53 in substantially the same manner as the rollers are held in the arrangement illustrated in Fig. 9. A separate device is provided for guiding the wheel-frame horizontally under the tank. This consists of angle-pieces 54, projecting downward from the tank, and vertical pins 55, projecting upward from the wheel-frame and carrying rollers 56, adapted to work between angle-pieces 54.

In the arrangement shown in Fig. 10 a plain bearing arrangement without rollers is seen. In this case a bar 57, with a groove along the center, is mounted under the transverse beam 50 in the tank, while a corresponding bar 58, mounted on the wheel-frame, has an arch 59 at the center fitting in the groove in the bar 57.

In Figs. 3 and 4 arrangements are shown consisting of shores for supporting the boat (shown in dotted lines) when inside the tank. The shores (indicated at 60) may be of any known form, preferably hydraulic. Near each end of the tank are pivoted at the sides on blocks 61 beams 62, carrying, in the example shown, pairs of shores 63. The beams are provided beyond their pivots with counter-weights 64, so that they may be raised or lowered when required. The block 61 at one end of the tank, at the entrance end in the example shown, is preferably arranged to slide longitudinally in any suitable way—as, for instance, by a slide engaging in a groove 67—by which means the beam may be moved longitudinally to suit different lengths of boats.

In using the arrangements described above the succession of operations will be substantially as follows: The tank having been placed in the position shown in Fig. 1, the boat is first admitted into the lock 1, and the gates 4 being closed water is allowed to enter the lock 1 until the boat is at such a level that it can enter the tank. The lock 2 and the tank are filled with water to the same level, and the gates 3 being open and the caisson 5 moved away into the recess 65 the boat can be floated into the tank and the caisson 5 replaced. The locks 1 and 2 can now be emptied. The boat is held up firmly in the tank by the hydraulic shores 60 and 63, hereinbefore referred to, the beam 62 having been lowered from the position shown in dotted lines in Fig. 7 to the position shown in full lines. The tank is now ready to travel over the rail-track, either to another stretch of water or up or down a slight incline to water at different level. In traveling the two main pivots 23 insure that the tank at these two points shall be over the guiding-rail 22, while the wheel-frames 31, guided by their rollers 32, slide across the tank when the track is curved, as in Fig. 5, this sliding being permitted by the use of bearing-surfaces of any of the types such as have been described above. When the tank arrives at its destination, it is backed against a lock similar to that shown in Figs. 1 and 2, and the boat is allowed to pass out by a reversal of the operations whereby it entered the tank. As before mentioned, the sliding and pivoting wheel-frames support the tank and allow it to pass around the curves without lateral bending. The buckling or bending of the plates 17 in the central part of the tank allows it to arch vertically to a certain extent, so that the tank can pass over vertical curves without damage. The spring axle-boxes supporting the wheels also facilitate this. From the above description it is thought that the method of construction and the manner of operation of the boat-transferring arrangement will be clearly understood.

Many modifications can be made without departing from the scope of the invention as defined by the following claims. For instance, in some cases substantial downwardly-projecting pins 66, having curved sides, may be attached beneath the tank for insuring that the sliding wheel-frames shall keep in their proper relative positions and at the desired distances apart. Where guiding arrangements such as are shown in Figs. 10, 11, and 12 are employed, such pins are, however, really unnecessary. Further, the arrangement of wheel-frames according to my invention is applicable to tanks of any construction for the reception and transport of boats, and I would have it understood that I do not limit myself to the exact construction of tank shown. The arrangement of the locks for admitting the boat to and removing it from the tank is also indicated merely by way of example, and any other known arrangement of locks adapted to serve the same purpose may be employed.

What I claim is—

1. In a boat-transferring apparatus the combination of a tank, a rail-track, a plurality of wheel-frames adapted to run on said track, a guide-rail and means connected to the tank for guiding the same over said guide-rail, means for guiding the wheel-frames, bearing-surfaces between the wheel-frames and the tank, and means for admitting a boat to and discharging a boat from the tank.

2. In a boat-transferring apparatus the combination of a tank, a rail-track, a plurality of wheel-frames adapted to run on said track, a guide-rail, means for guiding said wheel-frames along the guide-rail, two pivots fixed to the tank, wheel-frames on each of said pivots adapted to guide the tank along the guide-rail, wheel-frames and pivots connecting said frames to the tank at each side of the guiding wheel-frames, links connecting the latter wheel-frames to the guiding wheel-frames, and means for admitting a boat to and discharging the same from the tank.

3. In a boat-transferring apparatus the combination of a tank, a rail-track, a plurality of wheel-frames adapted to run on said track, means for guiding the tank in such manner that it will move longitudinally over the track, means for guiding the wheel-frames on the track, bearing-surfaces between the wheel-frames and the tank, and means for admitting a boat to and discharging the same from the tank.

4. In a boat-transferring apparatus the combination with a tank, rail-tracks therefor, and a plurality of wheel-frames for supporting the said tank, of bearing means between the wheel-frames and the tank comprising two surfaces of suitable form, a plurality of rollers adapted to work between said surfaces, and means for guiding the wheel-frames in a horizontal plane beneath the tank.

5. In a boat-transferring apparatus the combination with a tank, rail-tracks therefor, and a plurality of wheel-frames for supporting the said tank, of bearing means between the wheel-frames and the tank consisting of pairs of horizontal bearing-surfaces and a plurality of rollers adapted to work between the same, and vertical guiding-surfaces connected to the tank and the wheel-frames respectively.

6. In a boat-transferring apparatus the combination of a tank, rail-tracks therefor, and a plurality of wheel-frames for supporting the said tank, of bearing means between the wheel-frames and the tank consisting of pairs of horizontal bearing-surfaces and a plurality of rollers adapted to work between the same, and vertical guiding-surfaces beneath the tank and rollers adapted to engage with said surfaces for guiding the wheel-frames under the tank.

7. In a boat-transferring apparatus the combination of a tank, a rail-track, a plurality of separate wheel-frames, means for guiding said frames longitudinally of the track, pivotal means of connection between two of the guiding-frames only and said tank, bearing means between the wheel-frames and the tank, and means for admitting boats to and discharging the same from the tank.

8. In a boat-transferring apparatus, a tank having rigid ends, and a middle portion formed with buckled plates, adapted to allow said tank to bend in a vertical plane.

9. The combination of a tank for receiving boats, of means for closing the end of said tank, wheel-frames for supporting said tank, shores for supporting a boat against the rigid walls of the tank, and a beam, a counterweight therefor, a pivot, and shores mounted on said beam whereby the boat may be supported at its end after it has been introduced into the tank.

In testimony whereof I have signed my name to this specification in the presence of two subscribing witnesses.

THOMAS THOMSON.

Witnesses:
  V. D. LAKE,
  G. BULLOCK.